United States Patent
Auffret et al.

[11] Patent Number: 6,124,887
[45] Date of Patent: Sep. 26, 2000

[54] SPECAL EFFECTS CAMERA AND SYSTEM INCLUDING SUCH A CAMERA

[75] Inventors: Eric Auffret, Noyal sur Vilaine; Laurent Bizos, Gif sur Yvette; Laurent Blondé, Thorigné-Fouillard, all of France

[73] Assignee: Thomson Licensing S.A., Boulogne Cedex, France

[21] Appl. No.: 08/855,956

[22] Filed: May 14, 1997

[30] Foreign Application Priority Data

May 24, 1996 [FR] France .................................. 96 06506

[51] Int. Cl.⁷ .................................................. H04N 5/225
[52] U.S. Cl. ............................................ 348/239; 348/207
[58] Field of Search .................................... 348/207, 216, 348/217, 218, 370, 239, 684, 695, 272, 275, 276, 277, 278, 279, 222; 250/208.1; H04N 5/225

[56] References Cited

U.S. PATENT DOCUMENTS

| 3,806,633 | 4/1974 | Coleman | 348/216 |
| 5,132,802 | 7/1992 | Osthues et al. | 346/216 |
| 5,982,423 | 11/1999 | Sekiguchi | 348/216 |

FOREIGN PATENT DOCUMENTS

| 4-037383 | 2/1992 | Japan | H04N 9/75 |
| 4-047871 | 2/1992 | Japan | H04N 5/272 |
| 7-007665 | 1/1995 | Japan | H04N 5/272 |
| 7-154777 | 6/1995 | Japan | H04N 7/18 |
| 1 539 199 | 1/1979 | United Kingdom . | |
| 94/26057 | 11/1994 | WIPO | H04N 1/00 |

OTHER PUBLICATIONS

Copy of Search Report.

*Primary Examiner*—Tuan Ho
*Attorney, Agent, or Firm*—Joseph S. Tripoli; Kuniyuki Akiyama

[57] ABSTRACT

The present invention relates to a camera (1) for generating a cut key signal (K) for a subject moving in front of a background on the basis of invisible frequencies originating from the said background. The camera comprises an optical separator (3), a detector (7) and a processing circuit (9). The optical separator (3) makes it possible to separate the beam, representing the subject and the background, into four separate beams, including three colour beams (FR, FV, FB) and a fourth beam consisting of the invisible frequencies originating from the background. The detector (7) makes it possible to convert the energy contained in the fourth beam to an electrical signal (PIR), and the processing circuit (9) makes it possible to generate the key signal (k) from the electrical signal originating from the detection of the invisible frequency beam. The invention applies to the cutting of subjects moving in front of coloured backgrounds so as to place these subjects in front of new coloured backgrounds.

23 Claims, 7 Drawing Sheets

SPECAL EFFECTS CAMERA AND SYSTEM INCLUDING SUCH A CAMERA

BACKGROUND OF THE INVENTION

The present invention relates to the cutting of a subject moving in front of a background so as to make it possible to overlay this subject on a new background.

As is known to the person skilled in the art, a subject moving in front of a background is cut using a signal commonly referred to as a cut key.

The cut key makes it possible to distinguish between the background in front of which the subject is moving, and the actual subject.

The invention provides a novel definition of the cut key, and thereby a novel device for obtaining a cut key according to this novel definition.

In general, the invention relates to any type of electronic equipment employing a novel device such as the one mentioned above.

According to the prior art, it is necessary to calculate the cut key. It is then necessary to define, in the colour space, one or more volumes representing the background in front of which the subject is moving, so as to make it possible to extract the subject from the background.

The key calculation requires the colour space to be separated into three regions: a first region defining a volume representing the background, a second region defining a volume representing the subject, and a third region defining a transition region between the background and the subject.

As is known to the person skilled in the art, the first region, defining the volume representing the background, most often consists of a highly saturated blue colour having a very high degree of apparent uniformity. This means that the band of visible frequencies emitted by the background should be very narrow. This saturation and homogeneity constraint relating to the background in front of which the subject is moving requires this background, and therefore the subject, to be illuminated with a large amount of light. This strong illumination results in veritable problems in terms of visual realism and the quality of the images generated.

It is thus impossible, for example, to overlay a subject illuminated weakly in visible light.

The invention does not have this drawback.

SUMMARY OF THE INVENTION

The invention relates to a camera for generating a video signal representing a subject moving in front of a background. The camera comprises means for generating a cut key signal for the subject from invisible frequencies originating from the background.

Advantageously, the cut signal is then directly output by the camera.

The invention also relates to a device for generating a cut signal for a subject moving in front of a background. The device comprises means for generating a video signal representing the subject moving in front of the background, and means for detecting the background with the aid of invisible frequencies emitted by the background.

The invention also relates to a system for overlaying, on a second background, a subject moving in front of a first background. The system comprises a camera such as the one according to the invention, so as to generate a video signal representing the subject moving in front of the first background and a cut key signal from invisible frequencies originating from the first background, a device generating the video signal representing the second background, and a mixer for generating the image representing the subject overlaid on the second background from the video signal representing the subject moving in front of the first background, the cut key signal and the video signal representing the second background.

The invention further relates to a system for overlaying, on a second background, a subject moving in front of a first background, characterized in that it comprises:

a camera such as the one according to the invention, so as to generate a video signal representing the subject moving in front of the first background and a cut key signal from invisible frequencies originating from the first background, the camera comprising a circuit for multiplexing the video signal and the cut key signal so as to create a multiplexed signal output by the camera;

a control unit comprising a demultiplexer;

a transmission line for conveying the multiplexed signal to the demultiplexer in order to reconstruct, on the one hand, the video signal representing the subject moving in front of the first background and, on the other hand, the cut key signal;

a device generating the video signal representing the second background;

a mixer for generating the image representing the subject overlaid on the second background from the reconstructed video signal output by the control unit, the reconstructed key signal output by the control unit, and the signal representing the second background.

As mentioned above, one advantage of the invention is that it allows the overlaying of subjects illuminated weakly in visible light.

BRIEF DESCRIPTION OF THE DRAWINGS

Other characteristics and advantages of the invention will emerge on reading a preferred embodiment, given with reference to the appended figures, in which.

Throughout the figures, the same references denote the same elements.

DESCRIPTION OF THE PREFERRED EMBODIMENTS

Figure 1:
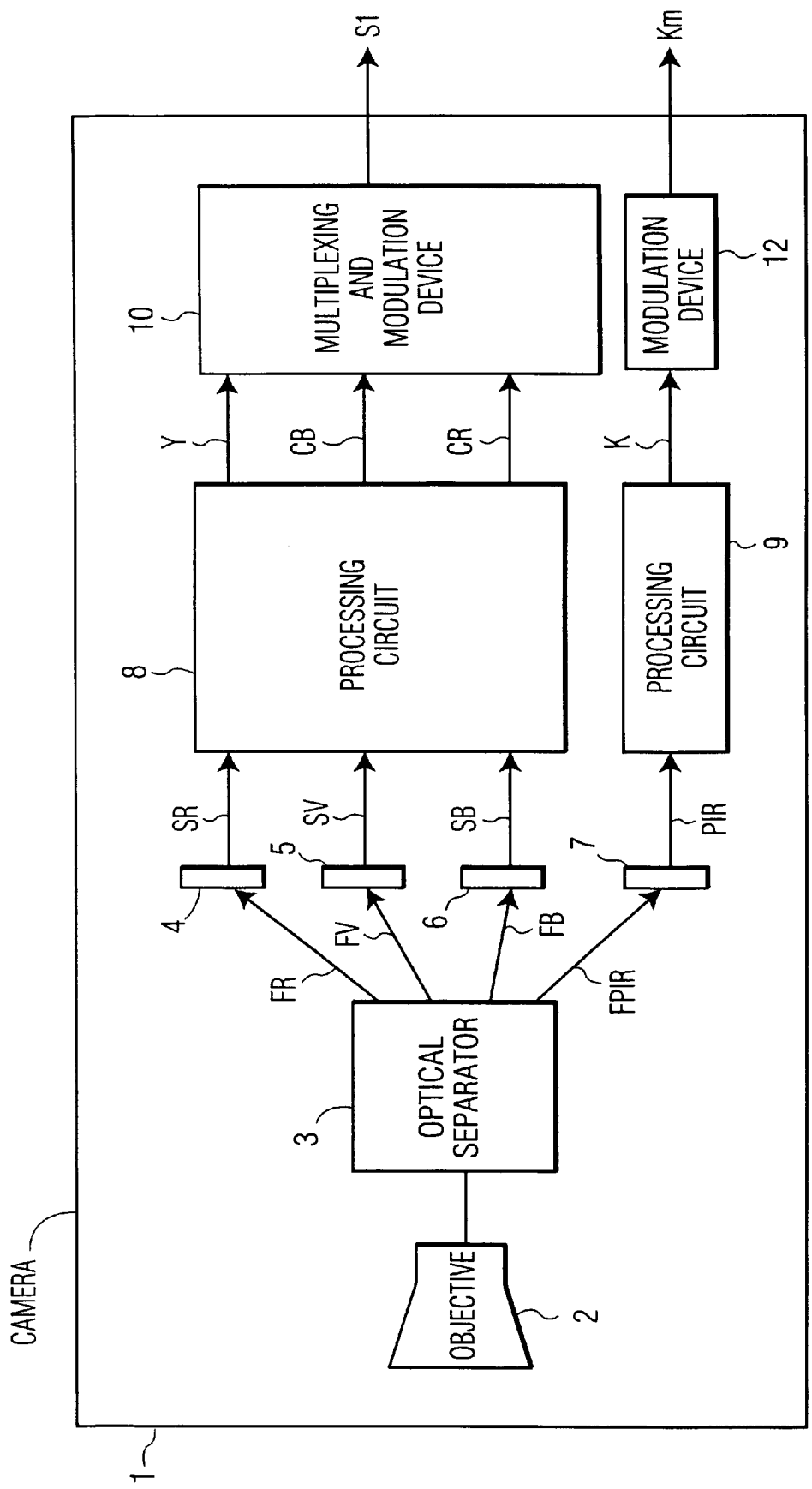
FIG. 1 represents the block diagram of a first embodiment of a camera according to the invention.

FIG. 1 represents the block diagram of a camera according to the invention.

The camera 1 comprises an objective 2, an optical separator 3, sensors 4, 5, 6, 7, processing circuits 8 and 9, a multiplexing and modulation device 10 and a modulation device 12.

The objective 2 forms an image in its focal plane. The image thus formed is directed towards the optical separator 3, the function of which is to separate the beam, representing the subject and the background in front of which the subject moves, into four separate beams: a red beam FR, a green beam FV, a blue beam FB and a beam FPIR of invisible frequencies which are preferably located in the near infrared frequency band. To this end, the optical separator 3 consists of a series of plane dioptric elements and filters. According to the preferred embodiment, a filter which transmits only the visible frequencies and the frequencies located in the near infrared is placed upstream of the separator 3. According to other embodiments, no filter is placed upstream of the separator 3.

The beam which represents the subject and the background in front of which the subject is moving is obtained by simultaneous illumination of the filmed scene using two series of lamps: a first series of lamps emitting in the visible range and not in the near infrared, and a second series of lamps emitting only in the near infrared. The background in front of which the subject is placed is then chosen so as to reflect or scatter some or all of the frequencies emitted by the second series of lamps, that is to say so as to reflect or scatter frequencies located in the near infrared.

Advantageously, the visible image is freed from the technical constraints which exist in the prior art cutting methods. In particular, various colours or combinations of visible colours may form the background in front of which the subject is moving.

In order to separate the various frequencies collected by the objective 2, the optical separator 3 is equipped with a series of plane dioptric elements and filters. A device for converting the light energy which it receives into an electrical signal is placed in the focal plane of each of the beams FR, FV, FB and FPIR The four devices 4, 5, 6, 7 for converting light energy into an electrical signal are preferably charge-coupled devices (CCDs). The beams FR, FV, FB and FPIR are then respectively converted into electrical signals SR, SV, SB and PIR Advantageously, the charge-coupled device 7 used to collect the frequencies located in the near infrared may be identical to the charge-transfer devices commonly used for collecting visible frequencies. Indeed, it has been found that the silicon technology charge-coupled devices currently used to detect visible frequencies have, in the near infrared, a non-negligible detection level which is sufficient to create a useful signal, such as the cut signal according to the invention.

The electrical signals SR, SV, SB output by the respective charge-coupled devices 4, 5, 6 are sent to the processing circuit 8, and the electrical signal PIR is sent to the processing circuit 9.

The processing circuit 8 processes the electrical signals which it receives in a manner which is known per se. Thus, the processing circuit 8 makes it possible to convert the electrical signals SR, SV, SB into digital signals for luminance Y, for blue colour difference CB and for red colour difference CR in 4:2:2 format, these being preferably coded over 10 bits.

In a manner known per se, the signals Y, CB, CR are sent to a device 10 for multiplexing and modulation so as to generate a multiplexed and modulated output signal S1 consisting of the luminance Y, blue colour difference CB and red colour difference CR data.

The processing circuit 9 makes it possible to generate the key signal K from the electrical signal PIR. Firstly, the electrical signal PIR is sampled at a sampling frequency preferably equal to the sampling frequency of the luminance signal. Secondly, the level of the electrical signal thus sampled is adjusted so as to ensure detection of the background in front of which the subject is moving. To this end, the level of the sampled electrical signal is compared, after having been optionally amplified if necessary, with a threshold value. This comparison may be carried out by any known means such as, for example, a TTL level comparator. When the level of the sampled electrical signal is less than the threshold value, the signal output by the comparator takes a first value, signifying that the background is not detected. When the level of the sampled electrical signal is greater than the threshold value, the signal output by the comparator takes a second value, signifying that the background is detected.

The binary signal output by the comparator constitutes the key signal K. According to an improvement of the invention, the processing circuit 9 comprises an analog/digital converter for digitizing the binary signal output by the comparator. The key signal K then consists of a digital information item coded, for example, over 10 bits. It is then possible to process the key signal thus digitized in order to improve the definition of the transition region.

Advantageously, the key signal K does not result from a calculation step, as is the case in the prior art devices. The key signal according to the invention is a signal resulting directly from the detection of the image constituted by the subject moving in front of the background. This results in a marked improvement in the details of the cut contour.

The key signal K output by the processing device 9 is sent to a modulation device 12 in order to form the modulated key signal Km intended to be transmitted.

According to the embodiment described above, the processing circuit 8 makes it possible to digitize the signals Y, CB, CR. However, the invention also relates to the case when the colour signals Y, CB, CR are not digitized.

When the camera is displaced in front of the image consisting of the subject moving in front of the background, it is often useful to register how far the camera has been displaced. According to the prior art, patterns coloured with the shades of the background colour are arranged on the background in order to serve as markers for the displacement of the camera. As mentioned above, according to the prior art, the cut key is calculated from the visible colour of the background, which colour must be saturated. This means that the colour shades of the various patterns cannot be too different from each other.

Advantageously, according to the invention, the cut key is provided by an invisible frequency signal reflected or scattered by the background. The patterns to be used as references for the displacement of the camera can then be produced from frequencies located in the near infrared, which need not be very close to one another. It is then possible to generate signals which are easier to discriminate and to process.

Another advantage of the invention consists in the facility of equipping the subject to be cut with markers which emit in the frequency range of the near infrared channel. It is then possible to use image processing in order to detect these markers in order to use their shape, position or any other characteristic to create special effects such as, for example, the manipulation of synthetic objects or the driving of a mixing shutter.

According to the embodiment described in FIG. 1, the video signal S1 output by the multiplexing and modulation device 12 and the modulated key signal Km leave the camera on two separate outputs.

Figure 2:
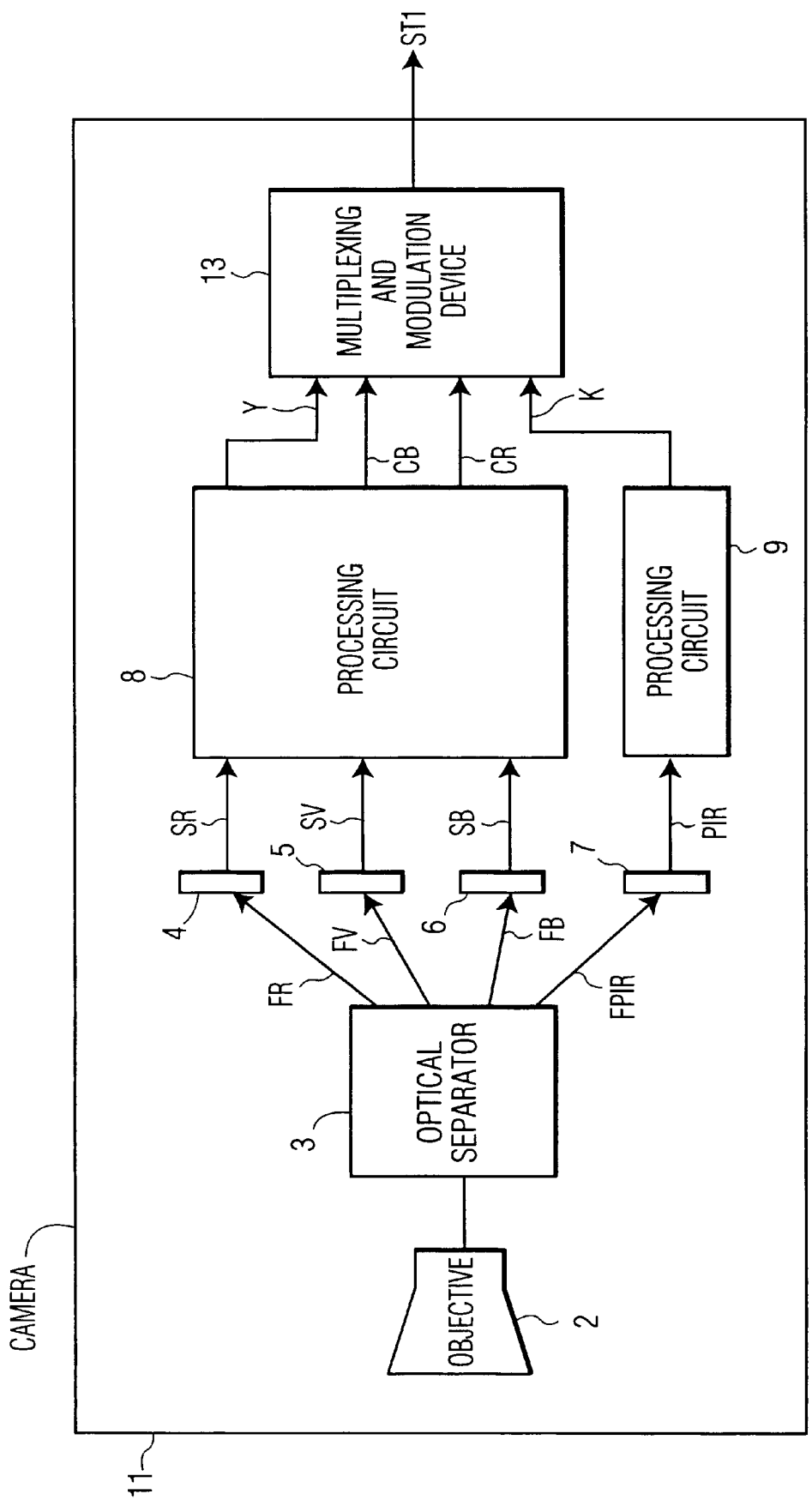
FIG. 2 represents the block diagram of a second embodiment of a camera according to the invention.

FIG. 2 describes a second embodiment of the invention, for which the video signal S1 and the modulated key signal Km leave the camera on a single output, so as to constitute the signal ST1. The camera 11 comprises an objective 2, an optical separator 3, four devices 4, 5, 6, 7 for converting light energy into an electrical signal, and two processing circuits 8 and 9.

According to the embodiment in FIG. 2, the luminance signal Y, the blue colour difference signal CB, the red colour difference signal CR and the key signal K are sent to a multiplexing and modulation device 13 for generating an output signal ST1.

In the case when the signals Y, CB, CR and K are coded over 10 bits, the signal ST1 then consists of a signal in 4:2:2:4 format, each component of which is coded over 10 bits.

The signal ST1 output by the camera can then be transmitted, for example, to a television studio or an outside-broadcast van via a single cable.

Figure 3:
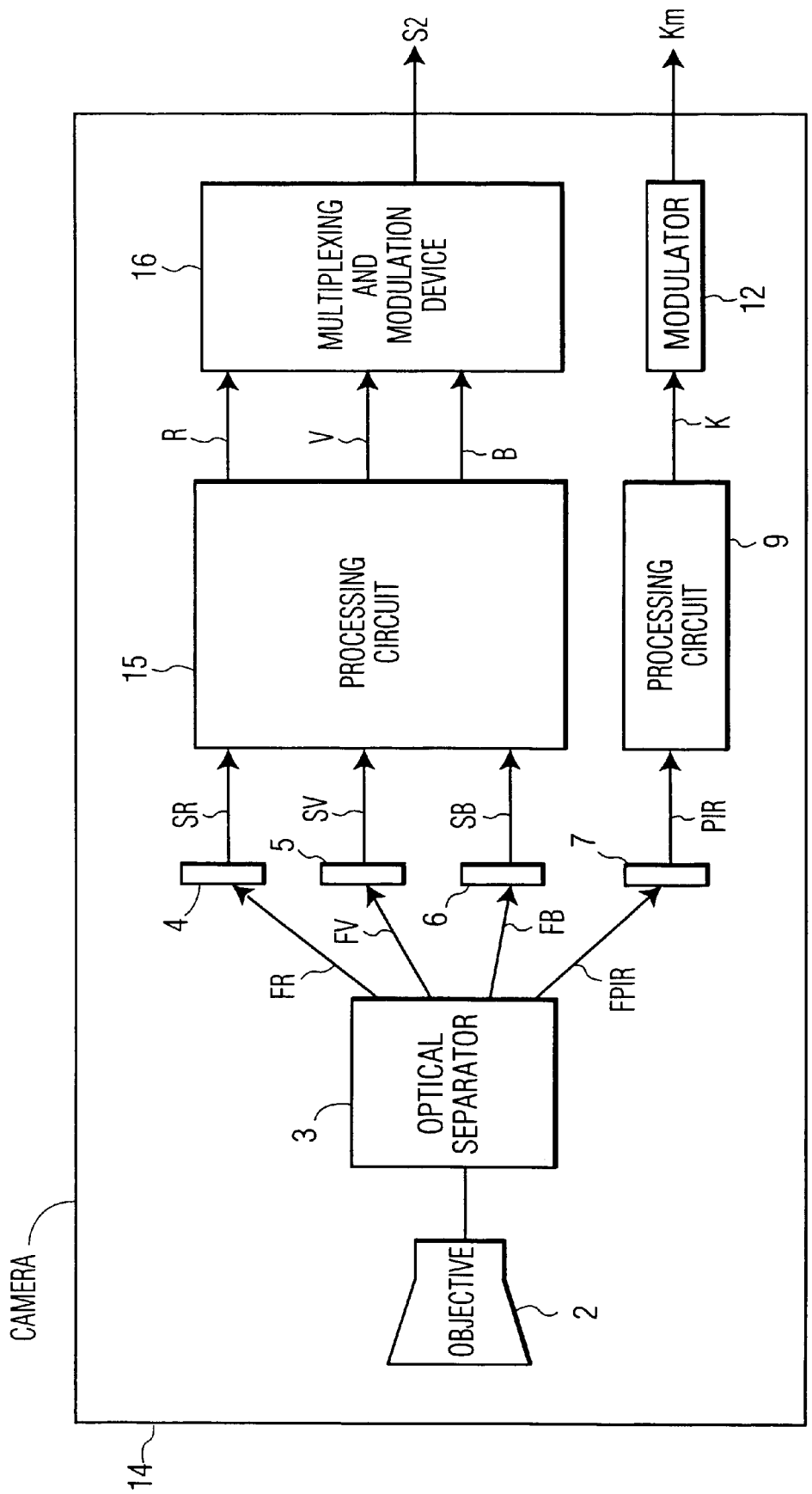
FIG. 3 represents the block diagram of a third embodiment of a camera according to the invention.

FIG. 3 represents the block diagram of a third embodiment of a camera according to the invention.

The camera 14 comprises an objective 2, an optical separator 3 and four sensors 4, 5, 6, 7 such as the ones represented in FIGS. 1 and 2.

The electrical signals SR, SV, SB output by the respective charge-coupled devices 4, 5, 6 are sent to the processing circuit 15, and the electrical signal PIR output by the charge-coupled device 7 is sent to the processing circuit 9.

The processing circuit 15 makes it possible to sample and digitize the signals SR, SV, SB so as to form colour signals R, V, B in 4:4:4 format, preferably coded over 10 bits.

The processing circuit 9 is the same as the processing circuit having the same reference described in FIG. 1. The sampling frequency of the signal PIR is preferably equal to the sampling frequency of the signals SR, SV, SB.

In a manner which is known per se, a multiplexing and modulation device 16 makes it possible to generate a signal S2 consisting of the multiplexed and modulated colour data. The key signal K output by the processing circuit 9 is modulated by the modulator 12 so as to form the modulated key signal Km.

According to the embodiment described above, the processing circuit 15 makes it possible to digitize the colour signals R, V, B. The invention also relates to the case when the colour signals R, V, B are not digitized.

According to the embodiment in FIG. 3, the video signal S2 and the modulated key signal Km leave the camera on two separate outputs.

Figure 4:
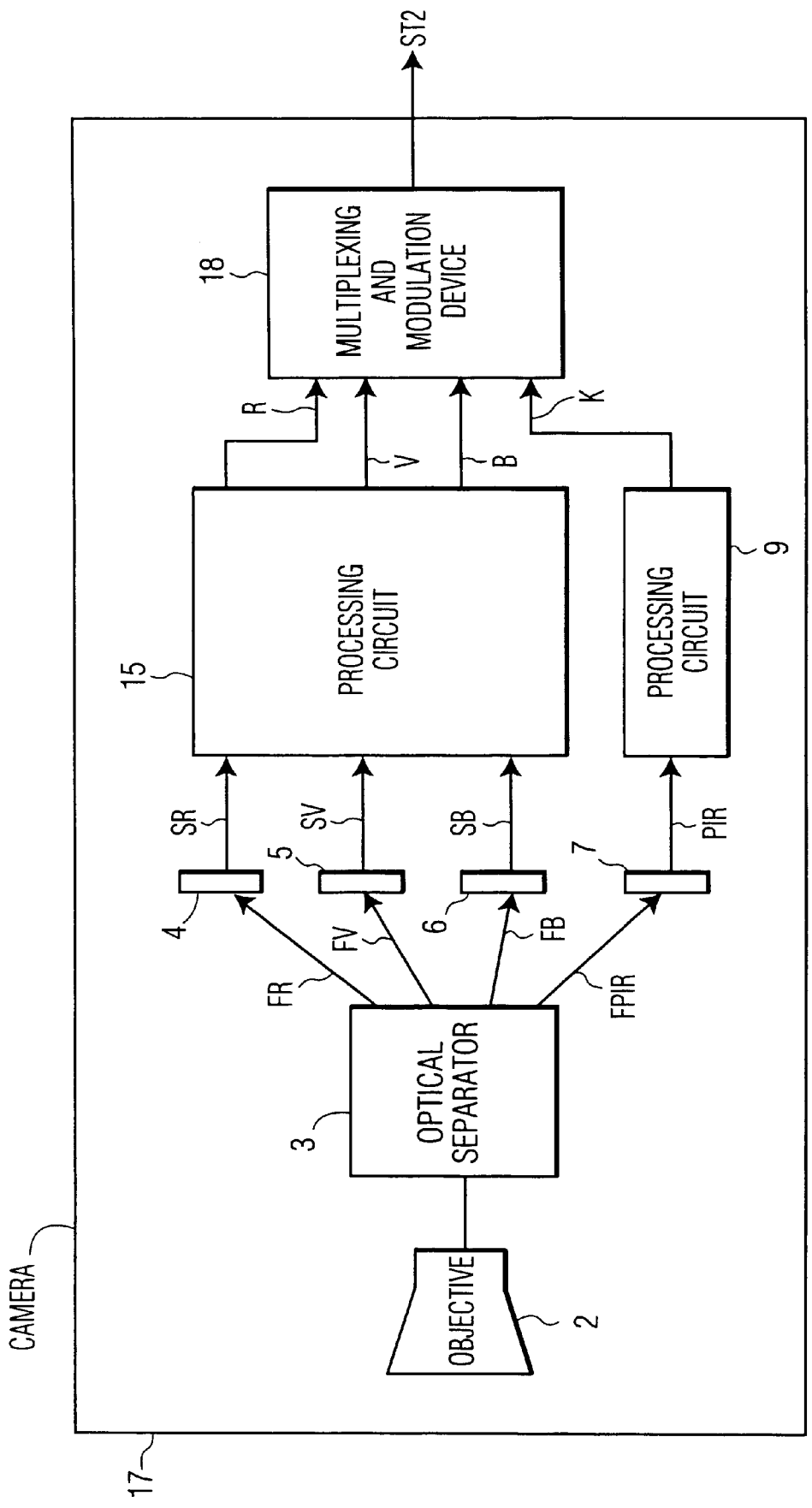
FIG. 4 represents the block diagram of a fourth embodiment of a camera according to the invention.

FIG. 4 describes a fourth embodiment of the invention, for which the video signal consisting of the colour signals R, V, B and the key signal K leaves the camera on a single output so as to form the signal ST2.

The camera 17 comprises an objective 2, an optical separator 3, four sensors 4, 5, 6, 7 and two processing circuits 15 and 9 such as the ones mentioned above. A multiplexing and modulation device 18 makes it possible to generate a single output signal ST2. The output signal ST2 leaving the camera can then be transmitted, for example, to a television studio or an outside-broadcast van via a single cable.

Figure 5:
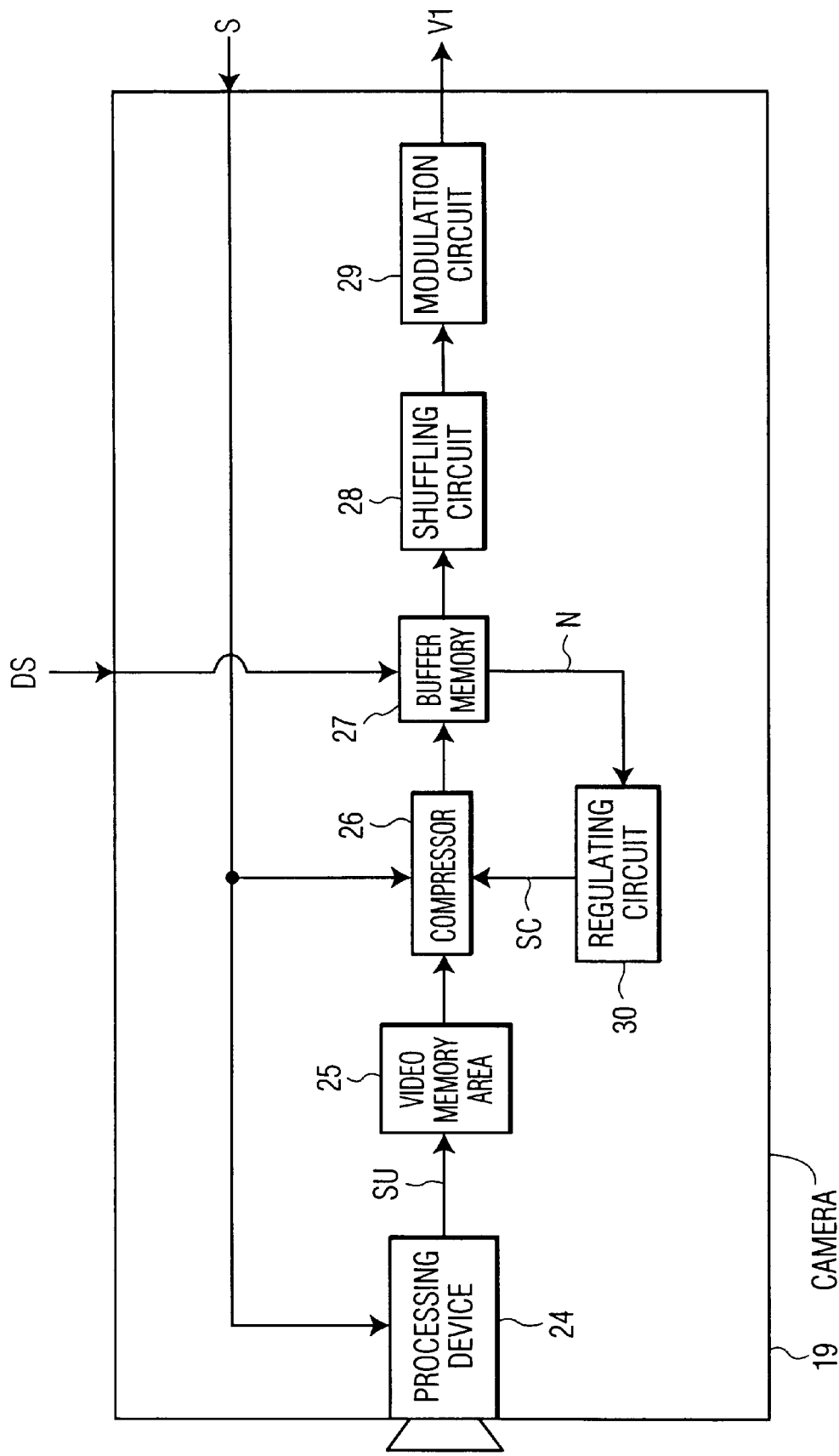
FIG. 5 represents the block diagram of a camera resulting from an improvement to the camera represented in FIGS. 2 or 4.

FIG. 5 represents the block diagram of a camera head resulting from an improvement to the camera head represented in FIG. 2 or 4.

All the circuits numbered 2, 3, 4, 5, 6, 7, 8 and 9 in FIG. 2, or 2, 3, 4, 5, 6, 7, 15 and 9 in FIG. 4, are here contained in a single unit having the reference 24, which also comprises a multiplexing circuit (not represented in FIG. 5) so that the signals output by the respective elements 8 and 9, or 15 and 9, constitute a single multiplexed signal SU.

According to the embodiment in FIG. 5, the camera 19 comprises, in addition to the processing device 24, a video memory area 25, a compressor 26, a buffer memory 27, a shuffling circuit 28, a modulation circuit 29 and a regulating circuit 30.

The processing device 24, the video memory area 25, the compressor 26, the buffer memory 27, the shuffling circuit 28 and the modulation circuit 29 are arranged in series. The sub-unit consisting of the video memory area 25, the compressor 26, the buffer memory 27 and the regulating circuit 30 constitute a system for ensuring a constant rate of the data output by the processing device 24.

The multiplexed signal SU output by the processing device 24 consists of the video signal representing the subject in front of the background and the key signal. Preferably, the signal SU is a digitized signal consisting either of the components Y, CB, CR, K in 4:2:2:4 format and coded over 10 bits, or the components R, V, B, K in 4:4:4:4 format and coded over 10 bits.

The data output by the processing device 24 is written in the video memory area 25 line by line. The video memory area 25 is, for example, a memory of the dual-access RAM type.

The video area memory 25, the compression circuit 26 and the buffer memory 27 each comprise a video input and a video output. The buffer memory 27 also comprises an auxiliary-signal input and a control output. The compression circuit 26 also comprises a compression control input and, preferably, a synchronization control input. The regulating circuit 30 comprises a control input and a control output.

The video output of the video memory area 25 is connected to the video input of the compressor 26, and the video output of the compressor 26 is connected to the video input of the buffer memory 27. The control output of the buffer memory 27 is connected to the control input of the regulating circuit 30, and the control output of the regulating circuit 30 is connected to the compression control input of the compression circuit 26.

According to the preferred embodiment of the invention, the compression carried out by the circuit 26 is JPEG mode compression and the number of lines accumulated in the video memory area 25 is at least equal to 8. More generally, however, the compression mode may be other than the JPEG mode. It may, for example, be any one of the MPEG modes and, more particularly, MPEG modes with reduced processing time such as, for example, the mode having a reference MPEG-2 4:2:2 profile main level (422@ ML). It is then possible to operate virtually in real time.

According to the preferred embodiment, as soon as the number of lines accumulated in the video memory area 25 reaches, for example, the value 8, the control signal SC originating from the control output of the regulating circuit 30 is applied to the compressor 26 so as to trigger the compression. In a manner which is known per se, the image is then decomposed into image blocks of 8×8 samples, corresponding to 8 pixels of 8 successive lines. Each image block is, for example, subjected to a discrete cosine transform to give transformed blocks of 64 coefficients. These coefficients are then quantized according to psycho-visual characteristics using rounding tables.

According to the preferred embodiment of the invention, the quantizing carried out using rounding tables takes up the duration of one image frame, i.e. 20 ms. More generally, the invention also relates to the cases when the quantizing takes up the duration of an integer multiple of the duration of an image frame. The compressed data received from the compressor 26 are sent to a buffer memory 27. The buffer memory 27 is, for example, a memory of the dual-access RAM type, or else a memory of the FIFO type. The buffer memory 27 comprises a counting circuit (not represented in FIG. 1). The function of the counting circuit is to count the number of times N that the buffer memory 27 has been written to over the duration of the quantizing operation, i.e. preferably the duration of one image frame (20 ms). The quantity N output by the counting circuit is applied to a comparison circuit (not represented in the figure) located at the input of the regulating circuit 30. The comparison circuit compares the value N with two threshold values. If N is greater than a first threshold value, the data output by the comparison circuit commands the regulating circuit 30 so as to accentuate the compression factor. If N is less than a second threshold value, the value of which is less than the first threshold value, the data output by the comparison circuit commands the regulating circuit 30 so as to reduce the compression factor. When N is between the two threshold values, the compression factor remains unchanged.

By way of example, according to the preferred embodiment, the first threshold value corresponds to 90% of the maximum number of data items which can be sent on the line between two successive frames, and the second threshold value corresponds to 80% of the maximum number of data items which it is possible to send on the line between two successive frames. The result of this is that the data compression is not changed for a value N of between 80% and 90% of the maximum number of data items which it is possible to send on the line between two successive frames.

According to an improvement to the invention, the processes of increasing and reducing the compression factor are optimized by the possibility which is provided of changing the value of the first and second thresholds while taking into account the change in the actual value of N.

A possibility of this type may advantageously be envisaged when the value of N varies frequently and in non-negligible proportions. For large increases in N, the value of the first threshold is then reduced, and for large reductions in N, the value of the second threshold is then increased.

Preferably, the regulating circuit 30 comprises a microprocessor. The management of the increase and decrease in the compression factor is then carried out by programming.

On start-up, the assembly consisting of the compressor 26, the buffer memory 27 and the regulating circuit 30 starts so as to ensure a high compression factor such as, for example, a compression factor equal to 15, so as not to run the risk of saturating the signal transmission. After start-up, the regulating circuit 30 slaves the compression factor to the content of the image as a function of the value of N. The reference duration for performing the analysis which leads to the slaving of the compressed data is preferably equal to the duration of one frame, i.e. 20 ms.

According to an improvement to the invention, a synchronization signal S is applied to the analysis and processing device 24 and to the compressor 26 so as to phase-lock the data generated by the circuits, with respect to an external phase reference (not represented in FIG. 5), thus making it possible to minimize the data transmission time.

Figure 6:
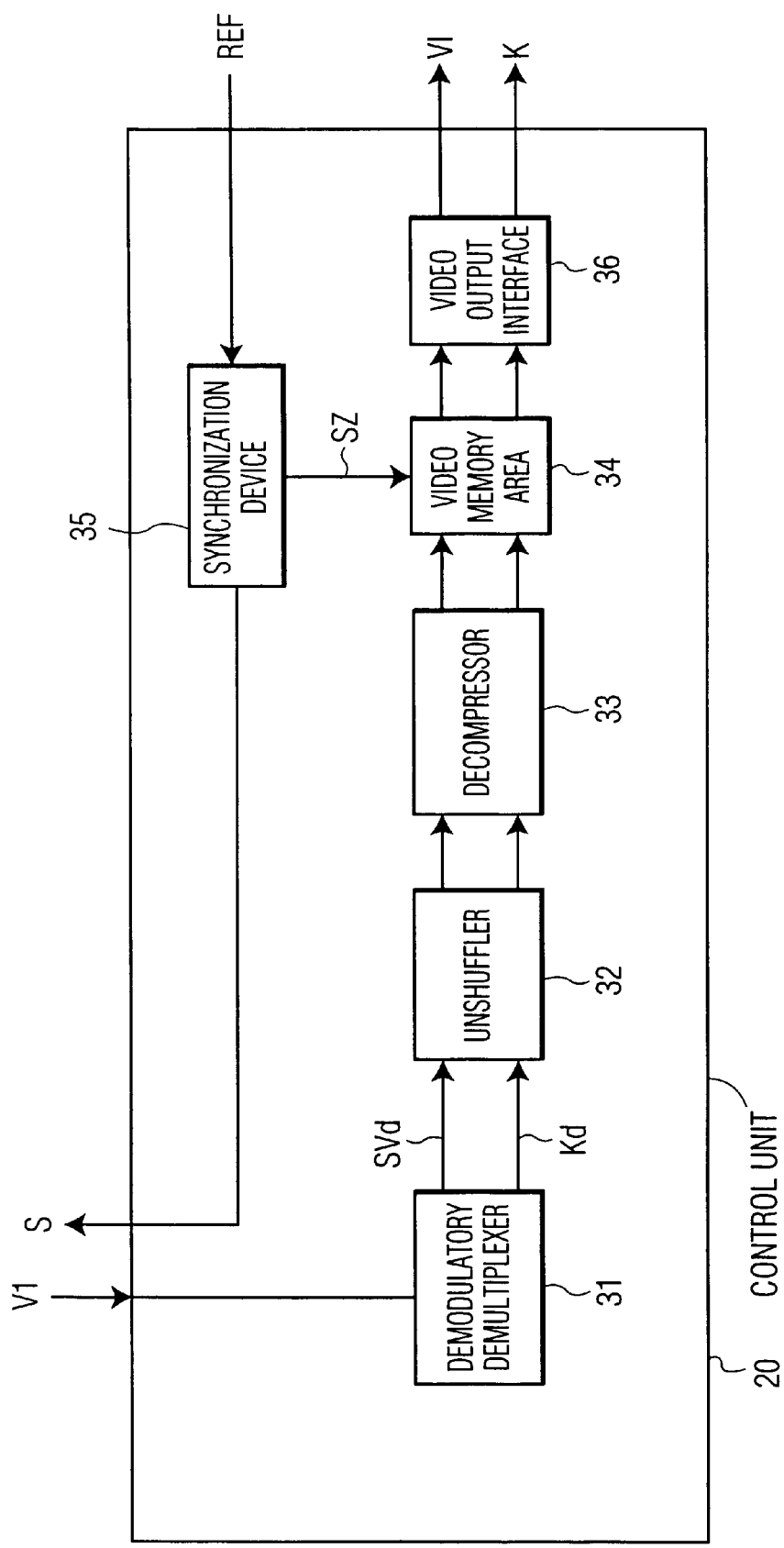
FIG. 6 represents the block diagram of a control unit for processing the video signal output by a camera such as the one represented in FIG. 5.

More generally, it should be noted that all the circuits represented in FIGS. 5 and 6 are subjected, in a manner which is known per se, to various synchronization signals and to various clock signals which are not represented in these figures so as not to overburden the drawings.

According to the preferred embodiment of the invention, the compressor 26 employs a type of coding which is known to the person skilled in the art by the name variable-length coding. It is then possible to reduce the size of the words with high probability. Preferably, the compressor 30 comprises an error-correction circuit. The signal output by the buffer memory 27 is sent to a shuffler 28, the function of which is to distribute with equal probability the value of the words to be transmitted, and the signal output by the shuffler 28 is itself sent to a digital modulator 29.

Various types of digital modulation may be used: conventional amplitude modulation (AM), single (SSB) or vestigial (VSB) sideband amplitude modulation, quadrature amplitude modulation (QAM) or else phaseshift keying (PSK) modulation. More generally, the digital modulator 29 according to the invention relates to any type of modulation with high spectral efficiency to transmit the data on a medium with limited passband.

The digital modulator 29 comprises a filtering device matched to the baseband before modulation, such as a Nyquist filter or a Gaussian filter. The carrier is synchronized with the rate of the elementary data transmitted.

According to the invention, the signal V1 output by the camera 19 may contain data other than those originating from the detection of the light signal L. As represented in FIG. 5, the service data DS, such as parameters inherent to the camera or else digital sound pick-up data may be input into the buffer memory 27 so that they can be sent on the same channel as the video signal. These service data DS are input into the buffer memory 27 via the auxiliary-signal input mentioned above.

FIG. 6 represents the block diagram of a control unit for processing the video signal output by a camera such as the one represented in FIG. 5.

The control unit 20 comprises, in series, a demodulator/demultiplexer 31, an unshuffler 32, a decompressor 33, and a video memory area 34 and a video output interface 36. Preferably, the control unit 20 also comprises a synchronization device 35 which, under the effect of an external time reference REF, generates a synchronization signal SZ which is applied to the memory area 34, as well as the signal S which is applied to the camera described in FIG. 6.

The signal SZ advantageously makes it possible to synchronize the video signal SV output by the control unit with other video signals, which are themselves synchronized with respect to the reference REF. A reference REF of this type proves beneficial in the case when a plurality of video signal sources are used simultaneously. The demodulator/demultiplexer 31 has the function of demodulating and demultiplexing the signal V1 which it receives so as to generate a video signal Svd and a key signal Kd which are demodulated. The unshuffler 32 and the decompressor 33 respectively perform the opposite operations to the operations performed by the shuffler 28 and the compressor 26. Like the video memory area 25, the video memory area 34 is matched to the chosen compression mode. By way of example, the video memory area 34 is a memory of the dual-access RAM type which, in the case of a JPEG mode compression, accumulates a number of lines at least equal to 8.

The signal output by the video memory area 34 is sent to the video output interface 36, the function of which is to put the video data output by the control unit in the desired standard. By way of example, the video output interface 36 may be a serializer making it possible to convert the parallel digital data output by the video memory area 34 into series data, or else a digital/analog converter making it possible to convert the digital data output by the video memory area 34 into an analog signal whose standard may, by way of example, be PAL, SE CAM or NT SC standard. According to the embodiment represented in FIG. 6, the key signal is itself also sent to the video output interface 36 so as to be put in the same standard as the video signal. According to other embodiments, however, the key signal is not put in the same standard as the video signal, and leaves the control unit 20 without passing through the interface 36.

According to an improvement to the preferred embodiment of the invention, provision is advantageously made that, when N reaches or exceeds the maximum number of data items which it is possible to send on the line between two successive frames, the video memory area 34 returns the same video frame until the normal operating conditions are re-established. Advantageously, continuity of the video signal is then ensured at the output of the control unit. In order to re-establish normal operating conditions, high compression factors, such as those applied on start-up, are applied to the compressor 4.

Figure 7:
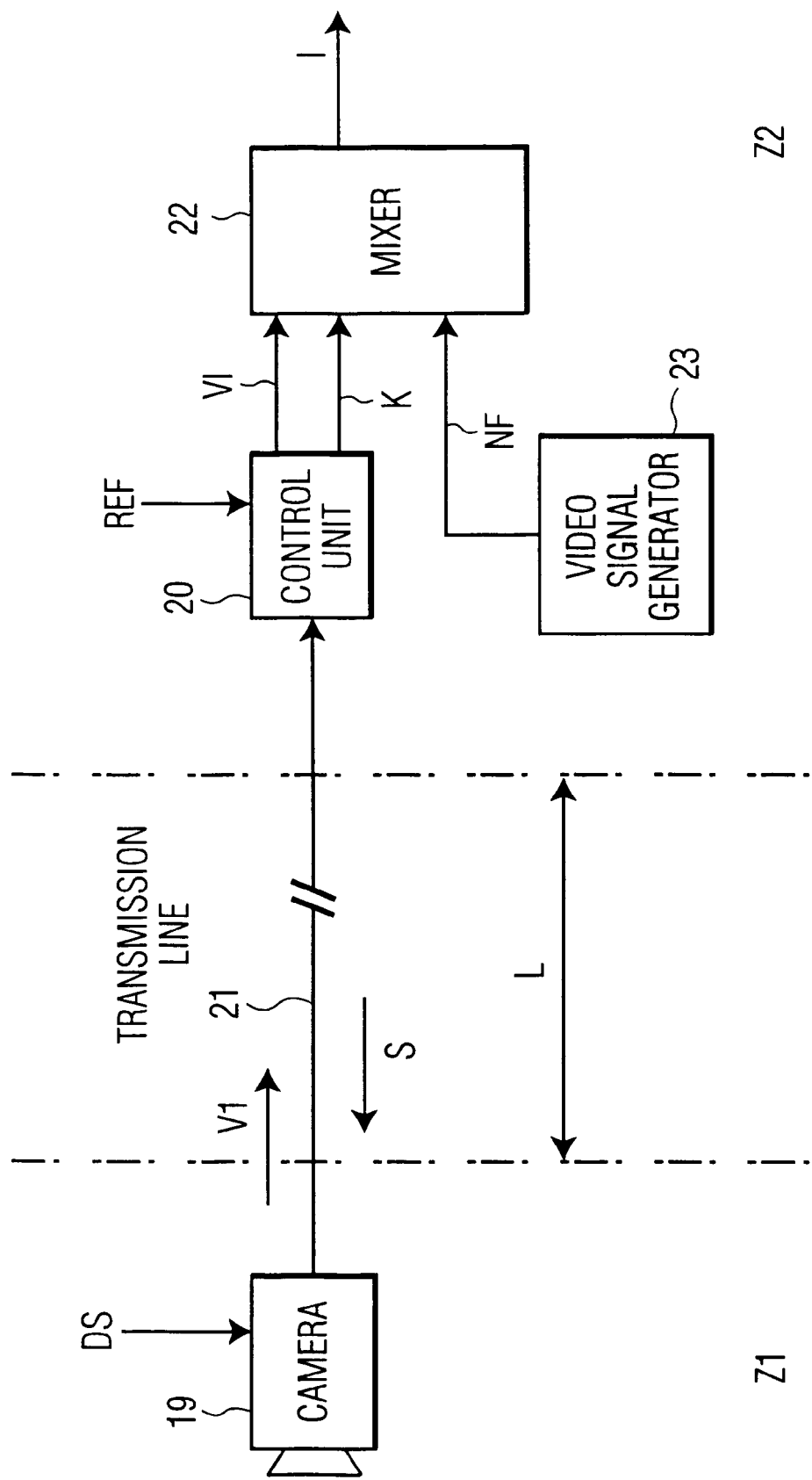
FIG. 7 represents a complete subject-overlaying system using a camera such as the one represented in FIG. 5 and a control unit such as the one represented in FIG. 6.

FIG. 7 represents a complete subject-overlay system using a camera such as the one represented in FIG. 5 and a control unit such as the one represented in FIG. 6.

Further to the camera 19 and the control unit 20, a system of this type comprises a transmission line 21 for connecting the camera to the control unit, a device 23 generating the video signal representing the new background NF on which the subject is to be overlaid, and a mixer 22 whose function is to generate the video image I representing the subject moving in front of the new background.

The camera 19 is located in a first region Z1 where the subject moving in front of the background is filmed. The control unit 20, the device 23 and the mixer 22 are located in a second region Z2. The regions Z1 and Z2 may be in the same television studio, but they may also be geographically separated so that, for example, the region Z2 is in a television studio other than the television studio where the subject moving in front of the background is filmed, or else in an outside-broadcast van distant from the camera. The regions Z1 and Z2 are separated by a distance L.

The control unit 20 makes it possible to demultiplex and demodulate the signals which it receives. In the case when the camera is such as the one described in FIG. 4, the control unit comprises circuits for converting the colour signals which it receives into signals for luminance Y, for blue colour difference CB and for red colour different CR In general, the control unit 20 generates a video signal VI representing the subject moving in front of the background and the key signal K.

The video signal VI, the key signal K and the video signal NF representing the new background onto which the subject is to be overlaid, are sent to the mixer 22 whose function is to generate the video image I representing the subject moving in front of the new background.

According to the embodiment described in FIG. 7, the transmission between the camera 19 and the control unit 20 takes place via a single transmission line 21 of conventional structure, such as a coaxial or triaxial cable, a twisted pair or a two-wire line. Advantageously, the length L of the transmission line can vary from a few centimeters to several kilometers. By way of example, the transmission line may thus be up to three kilometers.

As shown in FIG. 7, the video signal V1 and the synchronization signal S are preferably carried on the same cable.

According to another embodiment, the transmission between the camera and the control unit takes place by radio means.

According to the preferred embodiment of the invention described above, the definition of the cut key applies to a camera.

However, the invention relates to any type of electronic equipment employing the definition of the cut key according to the invention.

The invention thus also relates to the stand-alone cutting devices commonly referred to as "chroma-keyers". Advantageously, devices of this type then no longer comprise the complex circuits which, according to the prior art, are necessary for calculating the cut key.

What is claimed is:

1. Camera for generating a video signal representing a subject moving in front of a background, wherein the camera comprises:

an optical separator for separating a beam, representing the subject and the background in front of which the subject moves, into four separate beams, a red light beam, a green light beam, a blue light beam and a beam consisting of the said invisible frequencies;

four detection devices for converting the light energy which they receive into an electrical signal, each detection device being associated with a different beam of the four beams;

a first processing circuit intended to process the electrical signals output by the three detectors for converting the light energy of the blue, red and green light beams into electrical colour data; and a second processing circuit for converting the electrical signal output by the detector associated with the invisible frequency beam into a cut key signal.

2. Camera according to claim 1, wherein the camera comprises a device for multiplexing and modulation so as to create a video signal from the electrical colour data output by the first processing circuit, and a device for modulation so as to create a modulated key signal from the cut key signal.

3. Camera according to claim 2, wherein the first processing circuit comprises means so that the electrical colour data output by the said first processing circuit consist of the three primary signals, red, green and blue, which are associated with the beam representing the subject and the background in front of which the subject moves.

4. Camera according to claim 3, wherein the first processing circuit comprises means so that the three primary signals, red, green and blue, are digital signals in 4:4:4 format.

5. Camera according to claim 1, wherein the camera comprises a device for multiplexing and modulation so as to create a signal consisting of the data, multiplexed and modulated, output by the first and second processing circuits.

6. Camera according to claim 5, wherein the first processing circuit comprises means so that the electrical colour data output by the said first processing circuit are the luminance, blue colour difference and red colour difference data which are associated with the beam representing the subject and the background in front of which the subject moves.

7. Camera according to claim 5, wherein the first processing circuit comprises means so that the luminance, blue colour difference and red colour difference data are digital data in 4:2:2 format.

8. Camera according to claim 5, wherein the digital data are coded over 10 bits.

9. Camera according to claim 1, wherein the second processing circuit comprises means for sampling the electrical signal output by the detector associated with the invisible frequency beam, and means for comparing the signal output by the said sampling means with a threshold, so that the key signal takes a first value, signifying that the background is not detected, when the level of the sampled electrical signal is less than the threshold value, and a second value, signifying that the background is detected, when the level of the sampled electrical signal is greater than the threshold value.

10. Camera according to claim 9, wherein the second processing circuit comprises an analog/digital converter for digitizing the signal output by the comparison means.

11. Camera according to claim 1, wherein the device for detecting the beam consisting of the invisible frequencies is a charge-coupled device commonly used for detecting visible frequencies, the detected invisible frequencies then being located in the near infrared frequency band.

12. Camera according to claim 1, wherein a filter which transmits only the visible frequencies and the near invisible frequencies originating from the background is placed upstream of the optical separator.

13. System for overlaying a subject, moving in front of a first background, on a second background, wherein the system comprises a camera according to claim 1 so as to generate the video signal representing the subject moving in front of the first background, and the cut key signal, a device generating the video signal representing the second background, and a mixer for generating the image representing the subject overlaid on the second background, from the video signal representing the subject moving in front of the first background, the cut key signal, and the video signal representing the second background.

14. System according to claim 13, wherein the transmission line is a coaxial line.

15. System according to claim 13, wherein the transmission line is a two-wire line.

16. System for overlaying a subject, moving in front of a first background, onto a second background, wherein the system comprises a camera according to claim 1 so as to generate the video signal representing the subject moving in front of the first background, and the cut key signal, the said camera comprising a circuit for multiplexing the said video signal and the said cut key signal so as to create a multiplexed signal output by the camera, a control unit containing a demultiplexer, a transmission line for conveying the said multiplexed signal to the said demultiplexer in order to reconstruct, on the one hand, the video signal representing the subject moving in front of the first background and, on the other hand, the cut key signal, a device generating the video signal representing the second background, and a mixer for generating the image representing the subject overlaid on the second background from the video signal output by the control unit, the key signal output by the control unit and the video signal representing the second background.

17. System according to claim 16, wherein the said first and second processing circuits which are contained in the camera comprise circuits for digitizing the data which they process, so as to form digital data at the output of the multiplexing circuit, in that the camera comprises a sub-unit for compressing the said digital data and for providing a substantially constant rate of the said data, and in that the control unit comprises a sub-unit for decompressing the digital data output by the demultiplexer and for reconstructing, on the one hand, a video signal representing the image of the subject in front of the first background and, on the other hand, the cut key signal.

18. System according to claim 17, wherein the camera comprises a shuffler and a digital modulator which are mounted in series, the shuffler making it possible to shuffle the digital data output by the sub-unit contained in the camera, and in that the control unit comprises a demodulator and an unshuffler which are mounted in series, the output of the unshuffler being connected to the input of the sub-unit contained in the control unit.

19. System according to claim 18, wherein the sub-unit contained in the camera comprises a video memory area comprising a video input and a video output, a compressor comprising a video input, a video output and a control input, a buffer memory comprising a video input, a video output and a control output, the said buffer memory comprising means for generating, via the said control output, a data item for controlling the compression factor of the compressor, a regulating circuit having a control input and a control output, the video output of the video memory area being connected to the video input of the compressor, the video output of the compressor being connected to the video input of the buffer memory, the control output of the buffer memory being connected to the control input of the regulating circuit, and the control output of the regulating circuit being connected to the control input of the compressor, and in that the sub-unit contained in the control unit comprises a decompressor comprising an input and an output, and a video memory area comprising an input and an output, the output of the decompressor being connected to the input of the video memory area.

20. System according to claim 19, wherein the video memory area contained in the camera comprises a memory to which the digital data output by the multiplexing circuit are written line by line, the number of lines accumulated in the video memory area contained in the camera being at least equal to 8, in that the compressor comprises circuits operating in JPEG mode, in that the said means for generating the said data item consists of a counting circuit and a comparison circuit, the said counting circuit making it possible to count the number of times that the said buffer memory has been written to over the duration of one frame of the video signal, the comparison circuit making it possible to compare the said number of times with a threshold value so that, if the said number of times is greater than the said threshold value, the said information item commands the regulating circuit so as to accentuate the compression factor or, if the number of times is less than the said threshold value, the said information item commands the regulating circuit so as to reduce the compression factor, in that the decompressor comprises circuits operating according to the JPEG mode to decompress the video signal collected on its input, and in that the video memory area of the control unit comprises means to store a number of lines at least equal to 8 and to reconstruct the desired video image from the data collected on its input.

21. System according to claim 20, wherein the control unit comprises a synchronization device for generating, under the effect of an external time reference, a synchronization signal which is applied to the video memory area of the control unit so as to synchronize the signal output by the control unit with other video signals which are themselves synchronized with respect to the external time reference.

22. System according to claim 16, wherein the transmission line is a triaxial line.

23. System according to claim 22, wherein the transmission line has a length substantially between a few centimeters and three kilometers.

* * * * *